US012736672B2

(12) United States Patent
Jecker

(10) Patent No.: US 12,736,672 B2
(45) Date of Patent: Sep. 15, 2026

(54) METHOD FOR MEASURING A LATERAL SURROUNDING AREA OF A VEHICLE, MEASURING DEVICE, AND VEHICLE

(71) Applicant: Valeo Schalter und Sensoren GmbH, Bietigheim-Bissingen (DE)

(72) Inventor: Nicolas Jecker, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 214 days.

(21) Appl. No.: 18/030,695

(22) PCT Filed: Sep. 8, 2021

(86) PCT No.: PCT/EP2021/074629
§ 371 (c)(1),
(2) Date: Apr. 6, 2023

(87) PCT Pub. No.: WO2022/073706
PCT Pub. Date: Apr. 14, 2022

(65) Prior Publication Data

US 2023/0375702 A1 Nov. 23, 2023

(30) Foreign Application Priority Data

Oct. 7, 2020 (DE) ..................... 10 2020 126 172.1

(51) Int. Cl.
*G01S 15/931* (2020.01)
*G01S 7/539* (2006.01)
(Continued)

(52) U.S. Cl.
CPC ............ *G01S 15/931* (2013.01); *G01S 7/539* (2013.01); *G08G 1/168* (2013.01); *B60W 30/06* (2013.01);
(Continued)

(58) Field of Classification Search
CPC .. G01S 15/931; G01S 7/539; G01S 2015/465; G01S 2015/932;
(Continued)

(56) References Cited

U.S. PATENT DOCUMENTS

2007/0124106 A1 5/2007 Gotzig et al.
2019/0162850 A1 5/2019 Kempf et al.

FOREIGN PATENT DOCUMENTS

DE 10351314 A1 5/2004
DE 10361315 A1 7/2005
(Continued)

OTHER PUBLICATIONS

International Search Report and Written Opinion in corresponding International Application No. PCT/EP2021/074629, dated Dec. 23, 2021 (13 pages).

(Continued)

*Primary Examiner* — Scott A Browne
*Assistant Examiner* — Nazia Afrin
(74) *Attorney, Agent, or Firm* — Osha Bergman Watanabe & Burton LLP

(57) ABSTRACT

An ultrasonic measuring method involves activating an ultrasonic transceiver at a multiplicity of transmission/reception positions along a lateral direction to transmit a respective transmission signal in a transverse direction and receive a respective received signal waveform. Echo signals in the respective received signal waveform are identified and a set of reflection points are formed by trilaterating a respective reflection point multiple times based on two respective received signal waveforms and a respective echo signal from each of the two received signal waveforms. Multiple pairs made of a primary reflection point and a secondary reflection point are formed, identified on the basis of a position-based criterion as reflection points of a direct
(Continued)

and/or indirect reflection from the same object section. An object height at one of the reflection points is characterized as high or low.

13 Claims, 10 Drawing Sheets

(51) Int. Cl.
*G08G 1/16* (2006.01)
*B60W 30/06* (2006.01)
*G01S 15/46* (2006.01)

(52) U.S. Cl.
CPC ... *B60W 2420/54* (2013.01); *B60W 2554/801* (2020.02); *G01S 2015/465* (2013.01); *G01S 2015/932* (2013.01); *G01S 2015/937* (2013.01)

(58) Field of Classification Search
CPC ........ G01S 2015/937; G01S 2015/933; G08G 1/168; B60W 30/06; B60W 2420/54; B60W 2554/801; B60W 40/02
See application file for complete search history.

(56) References Cited

FOREIGN PATENT DOCUMENTS

| | | | | | |
|---|---|---|---|---|---|
| DE | 102005044050 | A1 | | 3/2007 | |
| DE | 102007035219 | A1 | | 1/2009 | |
| DE | 102007061235 | A1 | | 6/2009 | |
| DE | 102014111125 | A1 | | 2/2016 | |
| DE | 112017004333 | T5 | * | 5/2019 | G06V 20/58 |
| DE | 112016007206 | T5 | | 6/2019 | |
| DE | 102018102786 | A1 | | 8/2019 | |
| DE | 102018103414 | A1 | | 8/2019 | |
| DE | 102018202587 | A1 | * | 8/2019 | G01N 29/024 |
| DE | 112017006255 | B4 | | 7/2020 | |
| EP | 1484620 | A1 | * | 12/2004 | G01S 13/46 |
| EP | 1764630 | A1 | * | 3/2007 | G01S 15/46 |
| WO | WO-2005061985 | A2 | * | 7/2005 | G01S 15/46 |
| WO | 2019154745 | A1 | | 8/2019 | |

OTHER PUBLICATIONS

German Search Report in corresponding German Application No. 10 2020 126 172.1, dated Apr. 16, 2021 (5 pages).
Office Action issued in counterpart Korean Patent Application No. 10-2023-7015436 mailed Feb. 13, 2025 (18 pages).
First Office Action in corresponding Chinese Application No. 202180081186.6, dated Jun. 21, 2025 (25 pages).

* cited by examiner

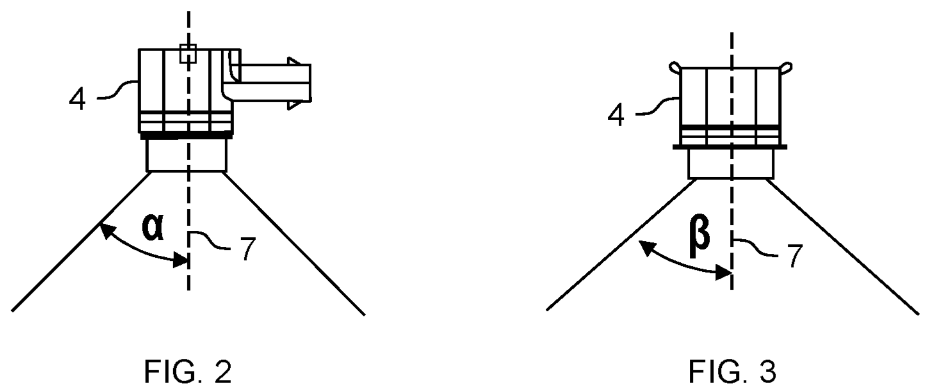
FIG. 2
FIG. 3
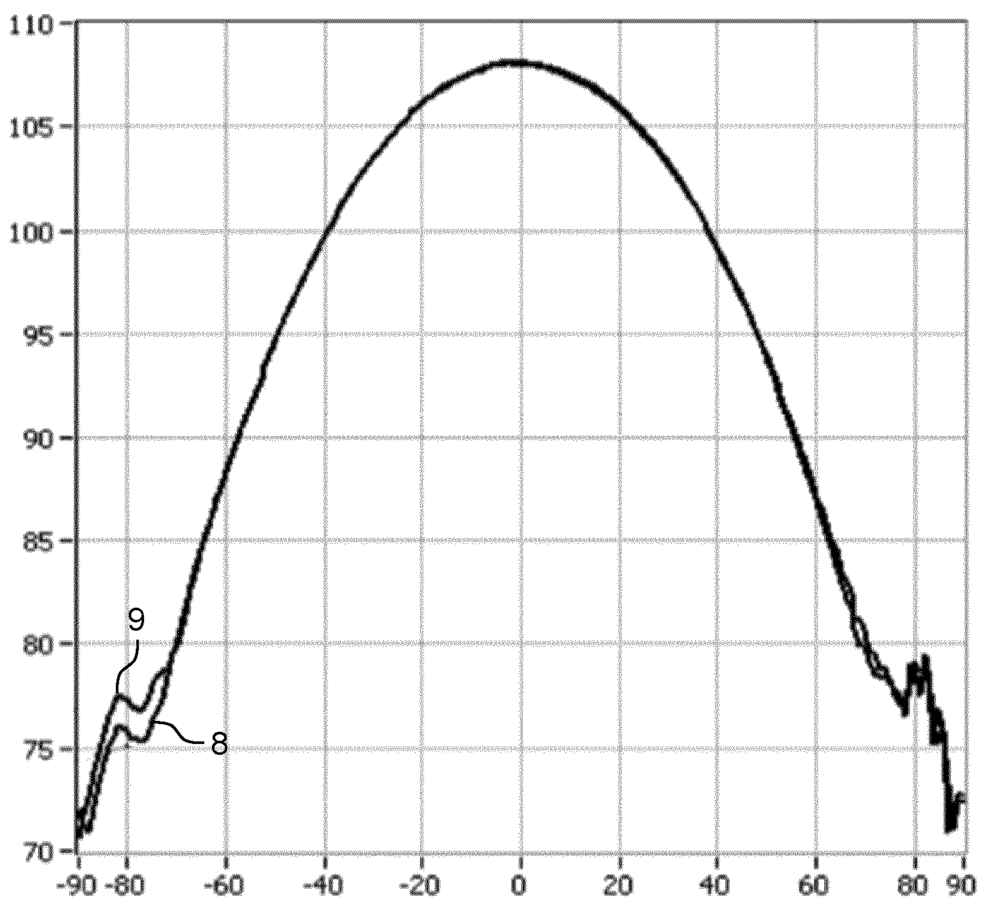
FIG. 4

METHOD FOR MEASURING A LATERAL SURROUNDING AREA OF A VEHICLE, MEASURING DEVICE, AND VEHICLE

The present invention relates to the field of parking assistance systems for motor vehicles, and in particular to a method and a measuring device for measuring lateral surroundings of a vehicle using a lateral ultrasonic transceiver, and to a corresponding vehicle.

Modern vehicles have parking assistance systems that are configured to measure lateral surroundings of a vehicle, to identify a parking space and to park the vehicle in the parking space semi-automatically or fully automatically. One known method for measuring the lateral surroundings uses ultrasonic transceivers in order to determine the distance to objects in the lateral surroundings based on the times of flight between transmitting a transmission signal and receiving an associated echo signal.

DE 10 2005 044 050 A1 also teaches a method for determining parking spaces for motor vehicles, in which the height of the object in lateral surroundings of a motor vehicle is assessed based on whether a single echo signal is received in response to the transmission of a transmission signal or two echo signals, forming a double echo, are received in one and the same received signal waveform.

Building on this idea, DE 10 2007 035 219 A1 teaches to generate an object classification signal on the basis of a number of local maxima in a received signal.

DE 10 351 314 A1 teaches a method for determining the position of a reflection point on an object in lateral surroundings of a motor vehicle. A respective transmission signal is transmitted at two different positions, an associated echo signal is received and a respective distance is determined. Based on the two distance measurements and the distance between the two positions, a precise position of the object is then calculated using the triangulation or trilateration method.

Against this background, one object of the present invention is to improve the measurement of lateral surroundings of a vehicle.

Accordingly, a first aspect proposes a method for measuring lateral surroundings of a vehicle provided with at least one lateral ultrasonic transceiver. The method comprises the following steps: a) activating the at least one ultrasonic transceiver at a multiplicity of transmission and reception positions along a lateral direction of travel of the vehicle so as to transmit a respective transmission signal in a transverse direction transverse to the direction of travel of the vehicle and receive a respective received signal waveform reflected from the lateral surroundings; b) identifying a number of echo signals in the respective received signal waveform; c) forming a set of reflection points by trilaterating a respective reflection point in the lateral surroundings multiple times on the basis of two respective received signal waveforms from the multiplicity of received signal waveforms and on the basis of a respective echo signal from each of the two received signal waveforms and storing it in the set of reflection points; d) forming multiple pairs formed of a respective primary reflection point and a respective secondary reflection point of the set of reflection points, which are identified on the basis of an at least position-based criterion as reflection points of a direct and/or indirect reflection from one and the same object section in the lateral surroundings; e) determining an object height at a respective one of the reflection points in the lateral surroundings as being high if the reflection point in question is a primary reflection point of one of the pairs formed, and as being low if no pair comprising the reflection point in question as a primary or secondary reflection point was formed in step d).

The proposed method thus picks up in particular on the idea of determining an object height on the basis of the presence of a double echo that occurs when a transmission signal is reflected both directly and indirectly from one and the same object section. However, it does not start at the level of a single echo signal waveform for the identification of such double echoes, but first trilaterates a multiplicity of reflection points on the basis of multiple echo signals from a multiplicity of echo signal waveforms, and then ascertains pairs of primary and secondary reflection points on the basis of a position-based criterion, wherein the primary and secondary reflection points do not, or do not necessarily, need to be trilaterated on the basis of identical received signal waveforms. A high object height is then determined where a corresponding pair of points was able to be formed.

In particular, the method offers the advantage of being able to obtain a significantly higher number of meaningful measurement points. The contours of objects in the lateral surroundings are thus able to be reconstructed better. Measurement points. In particular, obstacles that are set back in the lateral surroundings and that are located between other obstacles in the lateral surroundings and are shaded thereby may be made visible or measurable.

In the present case, a "measurement point" should be understood to mean in particular a trilaterated position of a reflection point and an associated object height determination as being "high" or "low".

The lateral ultrasonic receiver is attached in particular to one vehicle side or is configured to transmit ultrasonic signals or ultrasonic signal waveforms into the lateral surroundings of the vehicle and to receive them therefrom.

The transmission signal transmitted by the ultrasonic transceiver may in particular be a signal lobe, which may in particular be wide. "Transmitting a transmission signal in a transverse direction" may thus be understood to mean in particular that a maximum of a signal intensity of the transmitted ultrasonic signal is transmitted in the transverse direction. The signal intensity may drop laterally. In other words, the transmitted transmission signal may be transmitted in an angular range of for example 30, 60, 90, 120 or up to 180° or any other value between 0 and up to 180°, wherein the maximum of the signal intensity is transmitted in the transverse direction.

In the present case, a "signal" should be understood to mean in particular a signal pulse the temporal extent of which is defined by the temporal position of a maximum of a signal intensity and a width of the signal pulse around the maximum. In contrast, a "signal waveform" should be understood to mean in particular a profile of signal intensities that is transmitted or received over a longer period of time. A signal waveform may comprise one or more signals or signal pulses.

An "echo signal" should be understood to mean in particular a reflection of a previously transmitted transmission signal from the lateral surroundings of the vehicle.

In the present case, a "multiplicity" should be understood to mean a number of three or more, preferably 10 or more, very particularly preferably 50 or more. In the present case, "multiple" or a "plurality" should be understood to mean a number of two or more.

In particular, a transmission signal or transmission signal pulse is transmitted at a respective transmission position at a transmission time. A reception signal waveform is received at a respective reception position over a specific reception period. One or more echo signals are then identified therein.

The proposed method may in particular be implemented such that the vehicle drives to a first transmission and reception position, stops, the transmission signal is transmitted, the received signal waveform is received in full, then the vehicle drives to a next transmission and reception position, etc. In this case, the term "transmission and reception position" denotes a clearly defined position at which both the transmission signal is transmitted and the received signal is received.

The proposed method may in particular also be carried out while the vehicle is moving. In this case, the term "transmission and reception position" denotes multiple positions in a section along the lateral direction or direction of travel of the vehicle from the transmission of the transmission signal to the completion of the reception of the echo signal waveform. In this case too, an unambiguous transmission position may be identified for each transmission signal and a reception position of the respective echo signal may be determined for each identified echo signal. This may be achieved in particular based on a reception time of the echo signal in connection with speed data delivered by an odometry unit.

The number of echo signals may be "identified" in parallel with the reception of the respective received signal waveform or subsequently. In particular, the respective received signal waveform may be buffer-stored. The identification may take place based on the occurrence of maxima in the amplitudes (signal intensities) in the respective received signal waveform. In particular, a predetermined or variable threshold value may be applied and an echo signal may be identified if the amplitude (signal intensity) in the respective received signal waveform exceeds the threshold value.

The term "reflection point" denotes in particular a location on a surface of an object in the lateral surroundings from which, either actually or hypothetically assuming that a direct reflection back to the transceiver has taken place, an echo signal has been reflected back to the transceiver.

Trilateration of a reflection point should be understood to mean in particular determining a position of the reflection point using a trilateration method. In particular, a two-dimensional position of the reflection point is determined here in a plane spanned by the lateral and the transverse direction. During trilateration, the position of the reflection point is determined in particular based on the time differences between the transmission of the respective transmission signal and the reception of the respective echo signal and based on a distance between the transmission and reception positions associated with the respective transmission signal and the echo signal. The measured time difference between the transmission of a transmission signal and the reception of a first echo signal in time in particular makes it possible to determine a distance from the associated transmission and reception position to the reflection point by multiplying half the time difference by the speed of sound. The position of the reflection point then results in particular as the point of intersection of a circle around the first transmission and reception position with the first specific distance as radius with a circle around the second transmission and reception position with the second specific distance as radius.

"Forming a set of reflection points" should be understood to mean in particular that in each case two echo signals are repeatedly selected from two, fundamentally arbitrary, received signal waveforms and an associated reflection point is trilaterated. At least the trilaterated position of the reflection point is then stored in the set of reflection points. The set of reflection points may in particular be stored as a data structure, such as for example a list, array or graph, in a volatile or non-volatile storage device.

The in each case two echo signals may be selected for example from received signal waveforms received at adjacent transmission and reception positions. In this case, this results in particular in the advantage that it is easy to assign which two echo signals from the adjacent transmission and reception positions are to be respectively trilaterated with one another. The in each case two echo signals may however also be selected from transmission and reception positions that are not directly adjacent.

A "primary reflection point" should be understood to mean in particular a reflection point of the set of reflection points at which a direct reflection back to the ultrasonic transceiver took place. A "secondary reflection point" should be understood to mean in particular a reflection point of the set of reflection points that is trilaterated if two reflections took place in the lateral surroundings before the echo signal returns to the ultrasonic transceiver. The secondary reflection point is thus in particular a virtual reflection point. This is because, as a rule, neither of the two reflections took place at the trilaterated position of the secondary reflection point. On the contrary, the virtual, secondary reflection point indicates in particular a position at which a hypothetical directly reflected echo signal would have been reflected if it was received at the same time as the indirectly reflected echo signal.

When "forming multiple pairs" from respective primary and secondary reflection points, a number of first reflection points may be selected from the set of reflection points, in particular in succession. For each first reflection point, a check may be performed to determine whether there is a second reflection point in the set of reflection points that satisfies the at least position-based criterion. The search for such a second reflection point in the set of reflection points may in principle extend to the entire set of reflection points, to a selected portion thereof and in particular also to reflection points that were trilaterated using echo signals from received signal waveforms other than the first reflection point. If such a second reflection point is found, it may in particular be determined or assumed that the first reflection point is a primary reflection point and the second reflection point is an associated virtual secondary reflection point that arose due to multiple reflections of the transmission signal from one and the same object section.

In this case, "one and the same object section" should be understood to mean in particular a section of one and the same object in the lateral surroundings. The object section is in particular a section that is irradiated by a signal lobe of the transmission signal on the same object in the lateral surroundings.

It may accordingly in particular be determined in step e) that a high object is located at the trilaterated position of each reflection point determined in this way as a primary reflection point of a pair of reflection points, and that a low object is located at the trilaterated position of each reflection point of the set of reflection points that was not identified as a primary or secondary reflection point of a pair of reflection points. It may in particular also be determined that no object, or at least no reflective surface of an object, is located at the trilaterated positions of those of the reflection points of the set of reflection points that were identified as secondary reflection points of a pair of reflection points.

In this case, "high" should be understood to mean in particular a height at which an object or obstacle in the lateral surroundings should not be driven over or touched when parking. "Low" should be understood to mean in particular a height at which an object or obstacle in the lateral surroundings may be driven over when parking, that is to say in particular and for example a typical height of a curb of at most 15 cm, for example.

It should also be noted that the term "primary reflection point" is used below and in the claims—both to mean "reflection point that has already been determined as being a primary reflection point of a pair of reflection points" (in particular when discussing step e)) and to mean "first reflection point for which a suitable second reflection point that satisfies the criterion is sought in order to determine whether the first reflection point is a primary reflection point of a pair of reflection points" (in particular when discussing step d)).

A "pair of reflection points" and/or a "double echo" should be understood here and below to mean a pair formed of a primary and an associated secondary reflection point, for which it is assumed that they represent a directly reflected echo signal and an echo signal reflected multiple times from one and the same object section and another reflection point, or were trilaterated based on such echo signals.

According to one embodiment, the criterion in step e) comprises the fact that a respective secondary reflection point is arranged within a geometric search window defined relative to the respective primary reflection point.

The search window may in particular be defined in a two-dimensional plane that is spanned by the lateral and the transverse direction.

An extent of the geometric search window in the transverse direction may be limited to a distance to which ultrasound may be limited within a time difference between the arrival of the directly reflected and the multiply reflected echo signal that is to be expected when a double echo occurs. The extent of the geometric search window in the transverse direction may in particular be limited to a distance that ultrasound covers within preferably 2 ms, particularly preferably 1 ms.

An extent of the geometric search window in the lateral direction may be limited to a distance between two transmission and reception positions (lateral distance between two measurement locations).

The spatial position of a second reflection point in the geometric search window defined in this way on the basis of a first reflection point may be a necessary condition for the existence of a pair of reflection points. The number of computing operations for performing the search may additionally be reduced by restricting the search for the secondary reflection point to a geometric search window defined in this way.

According to a further embodiment, the geometric search window comprises at least one reflection point that has been trilaterated based on two respective echo signals that were identified in received signal waveforms other than the two echo signals based on which the primary reflection point was trilaterated.

The geometric search window may preferably furthermore also comprise at least one reflection point that has been trilaterated based on two respective echo signals that were identified in the same received signal waveforms as the two echo signals based on which the primary reflection point was trilaterated but that are different therefrom.

The measurement of lateral surroundings of a vehicle may be impaired by numerous factors, in particular noise, received signals that are difficult to interpret, shaded objects or processes in the lateral surroundings, etc. It may thus be case that not all echo signals in an echo signal waveform are able to be identified correctly, or not all of them are identified correctly. By searching for suitable secondary echoes (that is to say for echo signals based on which it is possible to trilaterate a secondary reflection point that satisfies the at least position-based criterion) in other received signal waveforms as well, it is possible to generate more meaningful measurement points despite the difficult measurement conditions.

According to a further embodiment, the geometric search window widens laterally in the transverse direction as the distance to the primary reflection point increases.

The geometric search window may in particular be punctiform at the location of the primary reflection point and widen in the transverse direction, in particular leading away from the measurement locations, in the shape of a triangle or a segment of a circle.

Such a configuration of the geometric search window makes it possible to reduce the probability of two primary reflection points being incorrectly identified as a pair of reflection points formed of a primary and a secondary reflection point when using a merely position-based criterion when searching for suitable secondary reflection points.

According to a further embodiment, out of multiple reflection points that satisfy the criterion in relation to a respective primary reflection point, the reflection point closest to the primary reflection point is selected as the secondary reflection point of the pair to be formed.

In particular, only and exclusively the reflection point closest to the primary reflection point may be identified as secondary reflection point of a pair of reflection points comprising the primary reflection point. Further second reflection points that will also satisfy the criterion are therefore not "consumed"; they may continue to be selected subsequently as potential primary reflection points for the search for suitable secondary reflection points. Thus, depending on the situation to be measured, the number of meaningful measurement points may advantageously be increased even further.

According to a further embodiment, the echo signals identified in the respective received signal waveform are ordered according to their chronological order, and, in step c), echo signals of the same order from echo signal waveforms received at adjacent reception positions are used to trilaterate a respective reflection point.

"Order" should be understood here in particular to mean a number that indicates the position of the echo signal in the chronological order of echo signals, that is to say "1" for the first echo signal in time in an echo signal waveform, "2" for the second echo signal in time in the same echo signal waveform and so on.

In principle, it is conceivable to increase the number of reflection points in the set of reflection points and thus the number of measurement points even further by combining any echo signal in a received signal waveform with any echo signal in a second echo signal waveform in order to generate an associated reflection point. According to the present embodiment, however, only echo signals that are first in time are combined with echo signals that are first in time, echo signals that are second in time are combined with echo signals that are second in time, etc., in order to trilaterate a respective reflection point. An amount of data to be processed may thus advantageously be reduced and yet at the same time a meaningfulness of the amount of data to be processed may be increased.

According to a further embodiment, the criterion in step e) comprises the fact that the order of the echo signals based on which the secondary reflection point was trilaterated is one higher than the order of the echo signals based on which the primary reflection point was trilaterated.

It is thus conceivable, purely by way of example, for a reflection point trilaterated based on second echo signals that are second in time from two received signal waveforms to be combined with a reflection point trilaterated based on echo signals that are third in time from the same or other received signal waveforms to form a pair of reflection points. However, with the criterion of the present embodiment, the reflection point trilaterated based on the echo signals that are second in time cannot be combined with an echo signal that is first in time, fourth in time or even later in time of the same or other received signal waveforms.

Accordingly, an amount of data to be processed may advantageously be reduced and at the same time a meaningfulness of the amount of data to be processed may be increased.

According to a further embodiment, the criterion in step e) comprises the fact that the secondary reflection point is further away from the transmission and reception point of the echo signal associated with the primary reflection point than the primary reflection point.

This accordingly advantageously makes it possible to reduce a probability of two primary reflection points that are substantially adjacent to one another in the lateral direction being incorrectly identified as a pair of reflection points formed of a primary and a secondary reflection point.

According to a further embodiment, the criterion in step e) comprises the fact that a distance between the primary reflection point and the secondary reflection point is smaller than a predetermined maximum distance.

The predetermined maximum distance may be determined taking into account an expected lengthening of the path of a multiply reflected echo signal compared to a directly reflected echo signal. The expected lengthening of the path depends in particular on an installation height of the ultrasonic transceiver and an expected distance between the vehicle and the object to be measured. For example, a lengthening of the path by 50 cm, taking into account the speed of sound of 343 m/s, results in a time difference of around 1.5 ms. The predetermined maximum distance may be selected in a range between 1 and 2 ms, and preferably as 2 ms.

It is thus possible to reduce a probability of a pair of reflection points formed of a primary and a supposed secondary reflection point being incorrectly formed from two primary reflection points on different objects.

According to a further embodiment, the criterion in step e) comprises the fact that a signal strength of at least one echo signal based on which the secondary reflection point was trilaterated is reduced by no more than a predetermined factor compared to a signal strength of at least one echo signal based on which the primary reflection point was trilaterated.

In particular, due to the longer signal path in the case of multiple reflection and due to the fact that the transmission signal has a signal lobe, that is to say is widened, it should be expected that the echo signals belonging to a virtual, secondary reflection point will be less in-tense than the echo signals belonging to the associated primary reflection point.

By taking the signal intensities into consideration, it is possible to reduce a probability of a pair of reflection points formed of a primary and a supposed secondary reflection point being incorrectly formed from two primary reflection points on different objects or object sections.

According to a further embodiment, the trilaterated position of a respective reflection point and optionally one or more attributes are stored in the set of reflection points for the reflection point, and steps e) and f) are performed after the completion of steps a), b) and c) based on the stored positions stored in the set of reflection points and where applicable the stored attributes of the reflection points.

Due to the fact that a multiplicity of ultrasonic measurements are initially performed and the entire set of reflection points is formed and only then are pairs of reflection points sought, it may advantageously be possible to generate further measurement points that would have remained undetected if pairs of reflection points were formed only from echo signals from two respective measurements.

In particular in the variant in which, in addition to the positions, further attributes are also stored in the set of reflection points, it may be possible to base the criterion that a second reflection point has to satisfy in order to be selected as a secondary reflection point associated with a primary reflection point not just on a relative position of the primary and the potential secondary reflection point, but also to base the criterion on other facts and thus to increase the meaningfulness of the generated measurement points.

An attribute for a respective reflection point may in particular comprise one or more of the following attributes: 1. Order of the echo signals in the respective received signal waveform based on which the reflection point was trilaterated; 2. Transmission and reception position of one or both of the received signal waveforms with the echo signals based on which the reflection point was trilaterated; 3. Signal strength of one or both of the echo signals based on which the reflection point was trilaterated.

A second aspect proposes a method for parking a vehicle that is provided with at least one lateral ultrasonic transceiver and a parking assistance system. The method of the second aspect comprises: performing the method of the first aspect or an embodiment thereof in order to determine the positions and the object heights at a multiplicity of primary reflection points in the lateral surroundings of the vehicle; determining a parking space in the lateral surroundings that is free from reflection points with an object height determined as being "high"; and parking the vehicle in the parking space using the parking assistance system.

The parking assistance system may be configured to give pointers or instructions to a human driver of the vehicle to carry out appropriate steering and driving procedures. The parking assistance system may also be configured in particular for partially autonomous or fully autonomous driving of the vehicle. Partially autonomous driving is understood to mean for example that the parking assistance system controls a steering device and/or an automatic speed level system. Fully autonomous driving is understood to mean for example that the parking assistance system also additionally controls a drive apparatus and a braking apparatus.

The parking assistance system may in particular cause the vehicle to drive past at a speed of preferably no more than 40 km/h, more preferably no more than 30 km/h and most preferably at walking speed along a direction of travel parallel to the lateral surroundings of the vehicle in which a parking space is suspected and in the process carry out the proposed method of the second aspect.

The multiple measurement points (positions and object heights) ascertained by performing the method of the first aspect may optionally also be combined or clustered using a clustering method. Incorrect determinations or less relevant determinations may be filtered out in the process based on statistical criteria. An accumulation of measurement points may in particular be evaluated here as a criterion for measurement points of high meaningfulness, while isolated measurement points may be filtered out as irrelevant. The proposed methods offer the advantage in particular of generating a larger number of measurement points, which may promote the ability to apply statistical methods.

A parking space may be understood to mean in particular an area in the lateral surroundings of the vehicle in which no objects determined as being "high" are arranged and the dimensions of which are larger than the dimensions of the vehicle, meaning that it is possible to park the vehicle parallel, diagonally or transversely in the free area.

The parking trajectory may be ascertained mathematically and/or using machine learning, a trained neural network or the like.

The vehicle may be caused to drive along the parking trajectory using PID control or the like. While driving, further ultrasonic measurements according to the proposed method of the first aspect or further measurements using other types of sensors may be carried out in order to continuously update the information obtained about the lateral surroundings.

A third aspect proposes a computer program product comprising instructions that, when executed by a computer device, prompt said computer device to carry out the method according to the first or second aspect.

A computer program product, such as for example a computer program means, may be provided or supplied for example as a storage medium, such as for example a memory card, USB stick, CD-ROM, DVD, or else in the form of a downloadable file from a server in a network. This may take place for example in a wireless communication network by transmitting a corresponding file containing the computer program product or the computer program means.

The computer device may in particular be part of the parking assistance system. The computer device may be an embedded device, a controller (ECU—electronic control unit) of the vehicle, a microcontroller, an industrial PC or the like.

A fourth aspect proposes a measuring device for a parking assistance system of a vehicle provided with at least one lateral ultrasonic transceiver. The measuring device is configured to measure lateral surroundings of the vehicle and comprises: a) a first unit that is configured to activate the at least one ultrasonic transceiver at a multiplicity of transmission and reception positions along a lateral direction of travel of the vehicle so as to transmit a respective transmission signal in a transverse direction transverse to the direction of travel of the vehicle and receive a respective received signal waveform reflected from the lateral surroundings; b) a second unit that is configured to identify a number of echo signals in the respective received signal waveform; c) a third unit that is configured to form a set of reflection points by trilaterating a respective reflection point in the lateral surroundings multiple times on the basis of two respective received signal waveforms from the multiplicity of received signal waveforms and on the basis of a respective echo signal from each of the two received signal waveforms and storing it in the set of reflection points; d) a fourth unit that is configured to form multiple pairs formed of a respective primary reflection point and a respective secondary reflection point of the set of reflection points, which it identifies on the basis of an at least position-based criterion as reflection points of a direct and/or indirect reflection from one and the same object section in the lateral surroundings; e) a fifth unit that is configured to determine an object height at a respective one of the reflection points in the lateral surroundings as being high if the reflection point in question is a primary reflection point of one of the pairs formed, and to determine it as being low if the fourth unit has formed no pair comprising the reflection point in question as a primary or secondary reflection point.

The features, advantages and embodiments described for the method of the first aspect also apply correspondingly to the measuring device of the fourth aspect.

A respective one of the units mentioned here may be implemented in the form of hardware and/or software. In the case of an implementation in the form of hardware, the corresponding unit may be for example in the form of a computer or a microprocessor. In the case of an implementation in the form of software, the corresponding unit may be in the form of a computer program product, a function, a routine, an algorithm, part of a program code or an executable object. Furthermore, each of the units mentioned here may also be in the form of part of a superordinate control system of the vehicle, such as for example a control unit (ECU: Engine Control Unit).

A fifth aspect proposes a vehicle comprising a parking assistance system that is configured for semi-autonomous or fully autonomous driving of the vehicle, wherein the vehicle and/or the parking assistance system comprises the measuring device of the fourth aspect.

The vehicle is for example an automobile or a truck. The vehicle preferably comprises a number of sensor units that are configured to capture the driving state of the vehicle and to capture an environment of the vehicle. Examples of such sensor units of the vehicle are image acquisition devices, such as a camera, a radar (radio detection and ranging) or a lidar (light detection and ranging), ultrasonic sensors, location sensors, wheel angle sensors and/or wheel speed sensors. The sensor units are in particular each configured to output a sensor signal, for example to the parking assistance system, which carries out the partially autonomous or fully autonomous driving on the basis of the captured sensor signals.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the de-pendent claims and of the exemplary embodiments of the invention that are described below. The invention is explained in more detail below on the basis of preferred exemplary embodiments with reference to the accompanying figures.

FIG. 2 shows a schematic view of an ultrasonic transceiver from a bird's eye view;

FIG. 3 shows a schematic view of the ultrasonic transceiver viewed along a vehicle longitudinal direction;

FIG. 4 shows a plot of an intensity of a transmission signal transmitted by the ultrasonic transceiver;

Identical or functionally identical elements have been provided with the same reference signs in the figures, unless stated otherwise.

Basic configurations and principles for determining distance, position and height in lateral surroundings of a vehicle are explained by way of example and may apply to all embodiments and exemplary embodiments of the invention.

Figure 1:
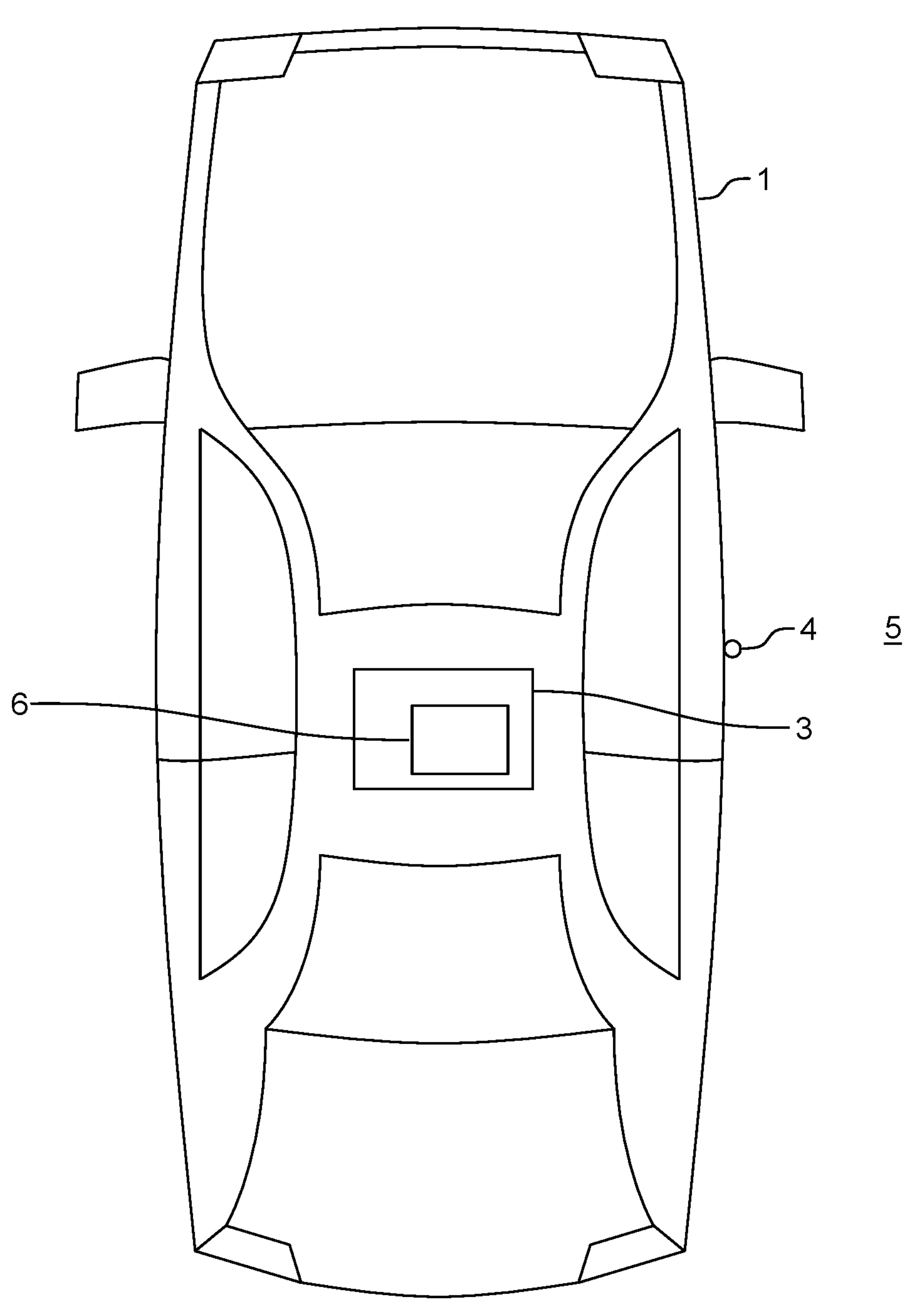
FIG. 1 shows a schematic view of a vehicle from a bird's eye view.

FIG. 1 shows a schematic view of a vehicle 1 from a bird's eye view. The vehicle 1 is for example an automobile that is arranged in surroundings 2. The automobile 1 has a parking assistance system 3 that is in the form of a control unit, for example. A plurality of environment sensor devices (not all are shown) are additionally arranged on the automobile 1. The plurality of environment sensor devices comprises in particular a lateral ultrasonic transceiver 4. The ultrasonic transceiver 4 is configured to transmit an ultrasonic transmission signal into the surroundings 2, and specifically into an area of the surroundings 2 of the vehicle 1 denoted lateral surroundings 5, and to receive an ultrasonic received signal waveform from the lateral surroundings 5. The parking assistance system 3 comprises in particular a measuring device 6. The measuring device 6 is configured to determine the positions and heights of objects (obstacles) in the lateral surroundings 5 using the ultrasonic transceiver 4 according to the proposed method and to output them to the parking assistance system 3. Using the sensor signals captured by the environment sensor devices and the positions and heights determined by the measuring device 3, the parking assistance system 2 is able to drive the automobile 1 semi-autonomously or even fully autonomously, and in particular to park it in a parking space (not shown) in the lateral surroundings 5. In addition to the ultrasonic transceiver 4 illustrated in FIG. 1, provision may be made for the vehicle 1 to have further sensor devices. Examples of these are further ultrasonic transceivers, optical sensors, visual cam-eras, a radar and/or a lidar, a microphone, an acceleration sensor, an antenna with a coupled receiver for receiving electromagnetically transmittable data signals, and the like.

FIG. 2 shows a schematic view of an ultrasonic transceiver 4 from a bird's eye view, FIG. 3 shows a schematic view of the ultrasonic transceiver 4 viewed along a vehicle longitudinal direction, and FIG. 4 shows a plot of an intensity of a transmission signal transmitted by the ultrasonic transceiver 4.

The ultrasonic transceiver 4 transmits a transmission signal along a transverse axis 7. The transverse axis 7, when the ultrasonic transceiver 4 is arranged as a lateral ultrasonic transceiver 4 on one side of the vehicle 1 (FIG. 1), is arranged transverse to the vehicle 1 (FIG. 1), that is to say transverse to a front-to-rear direction or longitudinal direction of the vehicle 1 (FIG. 1). The transmitted transmission signal comprises a signal lobe, that is to say it has an aperture angle $\alpha$ in the horizontal direction and an aperture angle $\beta$ in the vertical direction. The cone spanned by the aperture angles $\alpha$ and $\beta$ describes a three-dimensional surface in which a signal intensity of the transmitted ultrasonic transmission signal is reduced by a predetermined factor compared to the maximum signal intensity on the transverse axis. In FIG. 4, an angle against the transverse axis is plotted on the x-axis and a signal intensity (sound pressure level in dB) is plotted on the y-axis. The curve 8 describes a profile of the signal intensity in a horizontal plane and the curve 9 describes the profile of the signal intensity in a vertical plane, wherein the horizontal plane and the vertical plane each run through the transverse axis 7.

Figure 5:
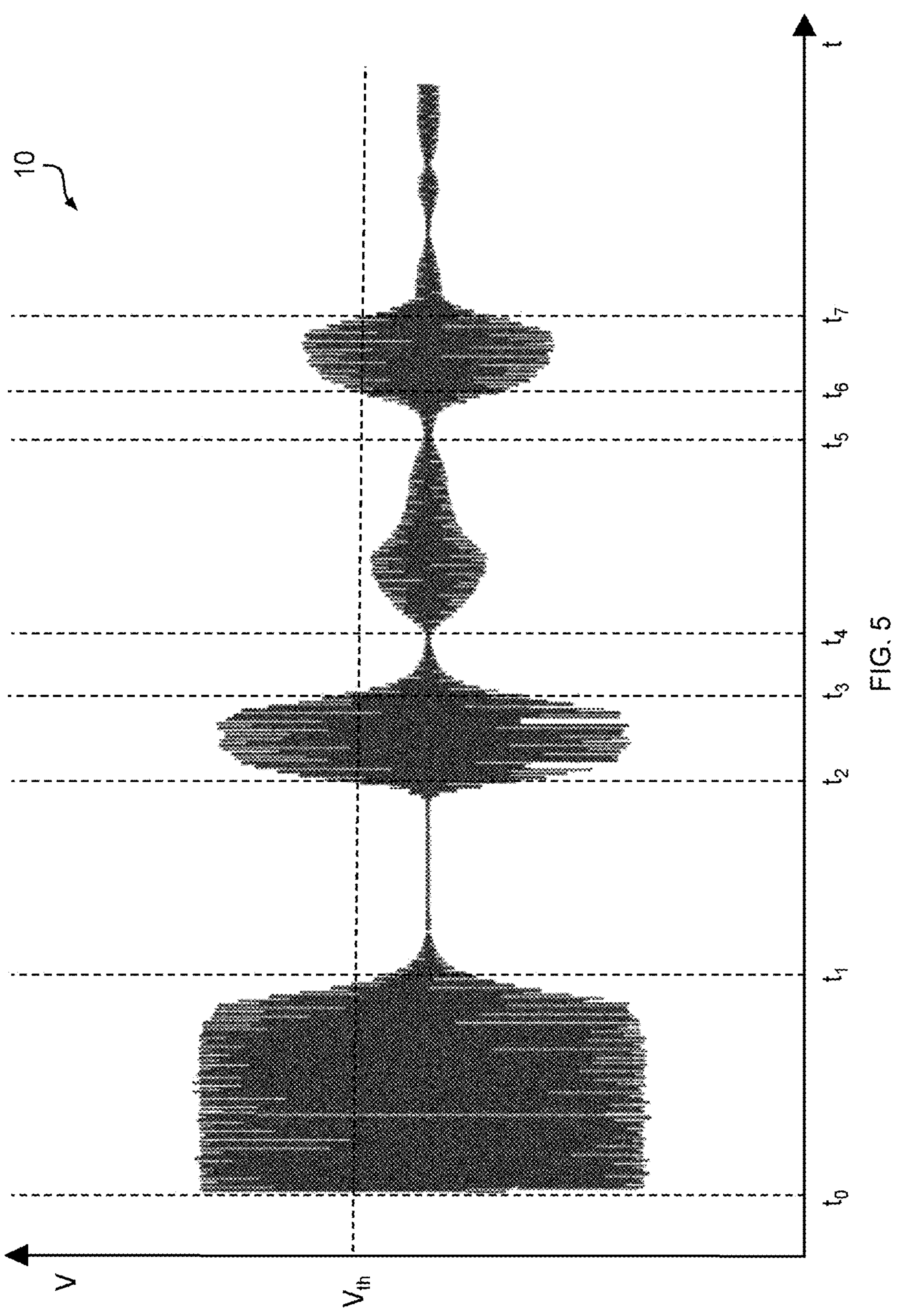
FIG. 5 shows a plot of a received signal waveform.

Reference is made to FIG. 1 to FIG. 5. FIG. 5 shows a plot of a received signal waveform 10 that is received by the ultrasonic transceiver 4 in response to the transmission of the transmission signal. The time t is plotted on the horizontal axis, and a sensor voltage output by the ultrasonic transceiver 4 is plotted on the vertical axis, this sensor voltage indicating a received signal intensity captured by the ultrasonic transceiver 4, that is to say a captured sound pressure.

At the time $t_0$, the ultrasonic transceiver 4 transmits a transmission signal. From the time $t_0$ to the time $t_1$, the ultrasonic transceiver immediately registers a reverberation of the transmitted transmission signal. The region of the received signal waveform 10 from $t_0$ to $t_1$ therefore cannot contain any information about the lateral surroundings 5 of the vehicle 1, and is sup-pressed, for example. At the time $t_2$, the amplitude of the received signal intensity increases, since a first echo signal arrives from the lateral surroundings 5 of the vehicle 1. The time $t_2$ in the received signal waveform 10 may be identified as the reception time of the first echo signal in the received signal waveform 10. At a time $t_4$, the amplitude of the received signal intensity increases again, but does not reach a threshold voltage $V_{th}$. The region from $t_4$ to $t_5$ may therefore not be identified as an echo signal, but rather regarded as an interference signal. From the time $t_6$ to the time $t_7$, a second echo signal is received from the lateral surroundings 5 of the vehicle and exceeds the threshold voltage $V_{th}$. The time $t_6$ may thus be identified as the reception time of a second echo signal in the received signal waveform 10.

The threshold voltage $V_{th}$ is not necessarily constant over the entire measurement of the received signal waveform 10. Unlike what is shown in FIG. 5, the threshold voltage may also be changed during the measurement of the received signal waveform.

It should be noted that the threshold voltage $V_{th}$ is essentially defined empirically. Errors in the identification of echo signals in the received signal waveform are therefore possible. With a threshold voltage $V_{th}$ selected slightly differently in FIG. 5, a second echo signal would thus be identified at the time $t_4$, and a third echo signal would already be identified at the time $t_6$. The proposed method also aims, inter alia, to deal with this situation in an improved manner.

Figure 6:
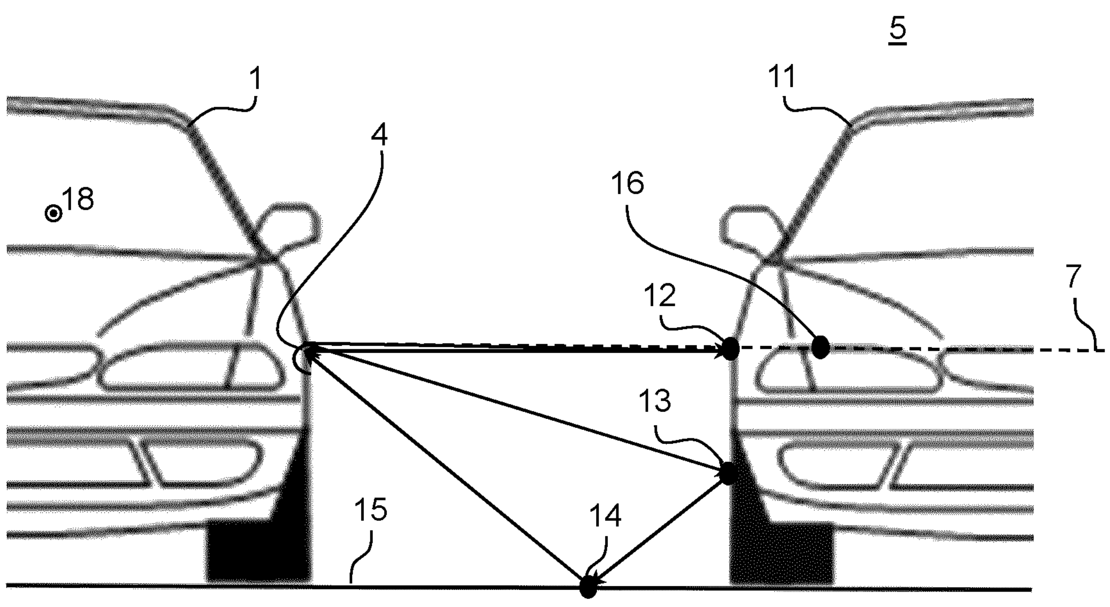
FIG. 6 shows a schematic depiction to illustrate the formation of a double echo in the case of a high obstacle.
Figure 7:
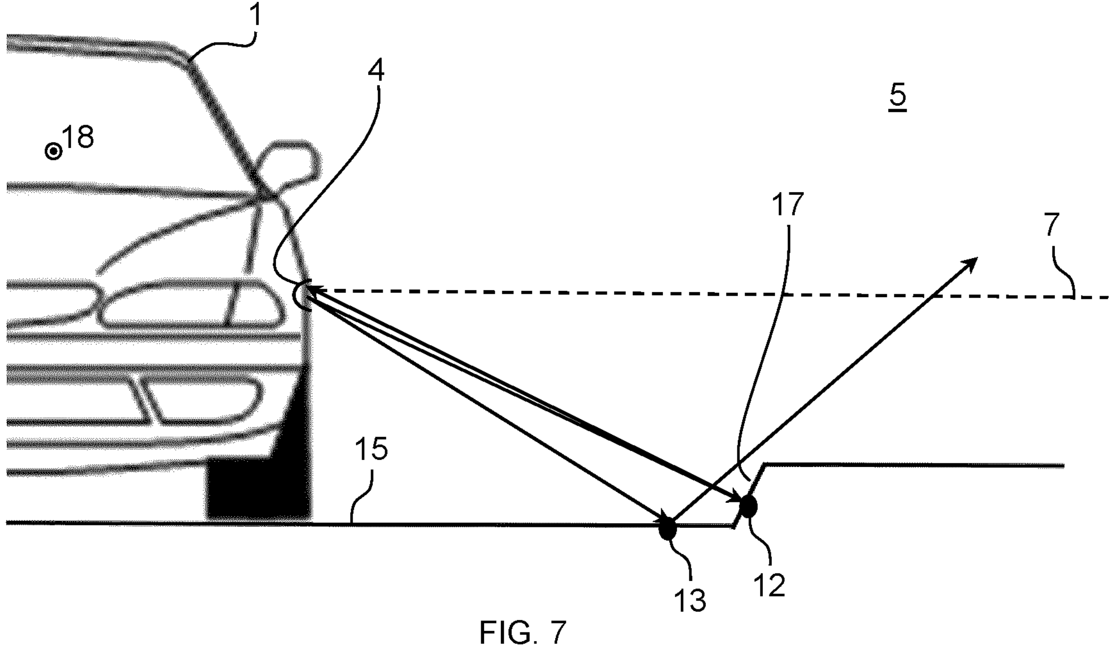
FIG. 7 shows a schematic depiction to illustrate the absence of a double echo in the case of a low obstacle.

FIG. 6 shows a schematic depiction to illustrate the formation of a double echo in the case of a high obstacle, and FIG. 7 shows a schematic depiction to illustrate the absence of a double echo in the case of a low obstacle. FIG. 6 and FIG. 7 are described with reference back to FIGS. 5 and 1. Arrows in FIG. 6, 7 illustrate propagation paths of transmission and echo signals.

FIG. 6 shows how the vehicle 1 drives past a parked vehicle 11 (object, obstacle) along a lateral direction of travel 18. The transmission signal transmitted by the ultrasonic transceiver 4 at the time $t_0$ propagates along the transverse axis 7 of the vehicle 1 to a first point 12 on a surface of the parked vehicle 11, is reflected from there, and the reflected echo signal propagates back along the transverse axis 7 and reaches the ultrasonic transceiver 4 again at the time $t_2$. The distance between the ultrasonic transceiver 4 and the first point 12 may be determined by multiplying the time difference between $t_2$ and to by the speed of sound 343 m/s and then dividing by two. The first point 12 is thus a first reflection point 12 the distance of which is able to be determined based on the first echo signal occurring at the time $t_2$.

A further component of the signal lobe of the transmission signal propagates in a direction diverging from the transverse axis 7 to a second point 13 on the surface of the parked vehicle 11, is reflected from there, as second echo signal, to a third point 14 on a ground 15 and, from there, back to the transceiver 4 again, where it arrives at the time $t_6$. When evaluating the received signal waveform 10, however, there is no information about the actual profile of the path of the incoming echo signals. Therefore, in the same way as described above for the first reflection point 12, a distance to a second, virtual reflection point 16 is determined, the position of which, as shown in FIG. 6, is provisionally assumed to be on the transverse axis 7 at a distance that corresponds to half the signal time of flight between transmission of the transmission signal at the time $t_0$ and arrival of the second echo signal at the time $t_6$.

The second reflection point 16 is also referred to as a "virtual" reflection point because, at the distance ascertained therefor to the ultrasonic transceiver 4—or at its position trilaterated therefor, if a trilateration takes place, as described later—no actual reflection took place. On the contrary, a distance or, using trilateration, a position is determined for such a virtual reflection point, at which position a reflection would have taken place if the associated echo signal had been reflected only once and not multiple times.

It should be noted that the first reflection point 12 on the surface of the parked vehicle 11 and the point 14 on the surface of the parked vehicle 14 that is not able to be determined using the described method are located in one and the same object section of the vehicle 14, which is irradiated by the signal lobe of the transmission signal.

FIG. 7 shows how the vehicle 1 drives past a curb 17 along a lateral direction of travel 18. A component of the signal lobe of the transmission signal transmitted at the time $t_0$ propagates from the ultrasonic transceiver 4 to a first point 12 on the curb 17, is reflected from there, and the reflected echo signal reaches the ultrasonic transceiver 4 at the time $t_2$. The first point 12 is thus a first reflection point 12 the distance of which is determined based on the first echo signal at $t_2$ in the same way as in the driving situation shown in FIG. 6. Although, similarly to what is shown in FIG. 6, there may also be a double reflection here from the curb 17 and then from the ground 15, in this case the time difference between the arrival of the doubly reflected echo signal and the once-reflected echo signal is so small that both echo signals are identified in the received signal waveform 10 as a single, first echo signal. A further component of the lobe of the transmission signal propagates to a second point 13 on the ground 15 and is reflected from there further away from the vehicle 1, without reaching the ultrasonic transceiver 4.

It may thus be determined that a high obstacle 11 is present in the lateral surroundings 5 of the vehicle 1 if it is possible to identify, in the received signal waveform 10, two echo signals that satisfy specific criteria so as to form a double echo, while a low obstacle 17 is present in the lateral surroundings 5 if it is possible to identify, in the received signal waveform 10, only one echo signal and/or two echo signals that however do not satisfy the specific criteria.

However, since, as described above, not all echo signals in an echo signal waveform are able to be identified correctly in every case, it is proposed to also search in a further echo signal waveform for a suitable second echo signal that, together with the first echo signal from the first echo signal waveform, forms a double echo.

Criteria for the association of such echo signals identified from the same or different echo signal waveforms may be in particular a spatial position of the reflection points able to be trilaterated from the respective echo signals relative to one another.

By way of example, it is thus possible to use, as a criterion, the fact that a spatial distance between two reflection points that form a pair of reflection points formed of a primary reflection point (12 in FIG. 6) and a secondary reflection point (16 in FIG. 6) corresponds to half the expected length difference between a direct reflection path (4, 12, 4 in FIG. 6) and an indirect reflection path (4, 13, 14, 4 in FIG. 6). A maximum distance of no more than for example 25 to 50 cm and preferably 35 cm has proven to be a good criterion.

Figure 8:
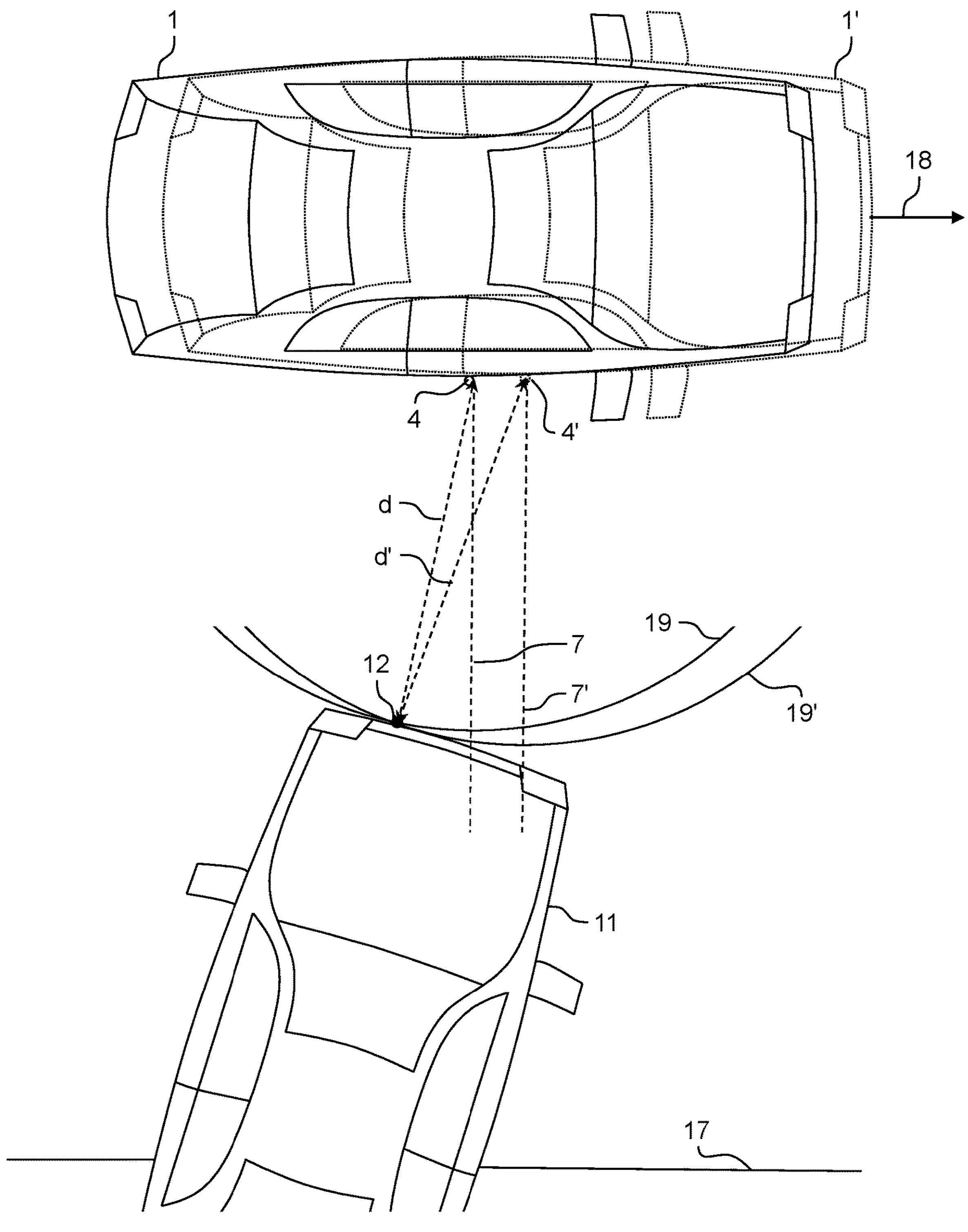
FIG. 8 shows a schematic depiction for illustrating trilateration.

FIG. 8 shows a schematic depiction to illustrate the trilateration of a position of a reflection point 12. FIG. 8 shows the vehicle 1, 1' while driving, in a lateral direction 18, past a curb 17 (low obstacle or object) on which another parked vehicle 11 (high obstacle or object) is parked diagonally. The vehicle is shown with reference sign 1 at a first time and with reference sign 1' at a second time. The ultrasonic transceiver 4, 4' is accordingly shown with reference sign 4 at a first transmission and reception position at the first time and with reference sign 4' at a second transmission and reception position at the second time.

At the first time at the first transmission and reception position of the ultrasonic transceiver 4, a transmission signal is transmitted in the manner described above with reference to FIGS. 5 to 7 and a received signal waveform is received, and a distance d to a first reflection point 12 at which the echo signal was reflected is determined based on a time at which an echo signal is identified in the received signal waveform. At the second time, a distance d' to the first reflection point 12 is determined in the same way at the second transmission and reception position of the ultrasonic transceiver 4. The position of the first reflection point 12 then results as the point of intersection of a circle 19 with radius d around the first transmission and reception position with 4 as the center with a circle 19' with radius d' around the second transmission and reception position with 4' as the center. The driving situation shown in FIG. 8 thus results in a position of the reflection point 12 that is offset laterally with respect to the transverse axes 7, 7' of the ultrasonic transceiver 4, 4'. The trilateration thus makes it possible to improve the precision of the actual position of the reflection point 12 compared to an initially assumed position at a respective point of intersection of the transverse axes 7, 7' with the circles 19, 19'.

Figure 9:
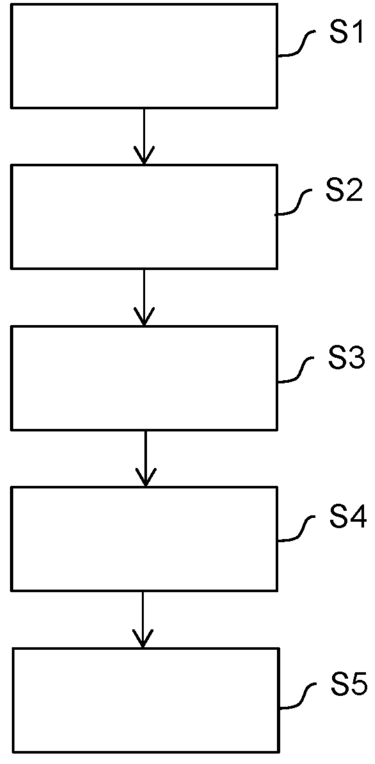
FIG. 9 shows a flowchart of a method for measuring lateral surroundings of the vehicle from FIG. 1 according to one exemplary embodiment.
Figure 10:
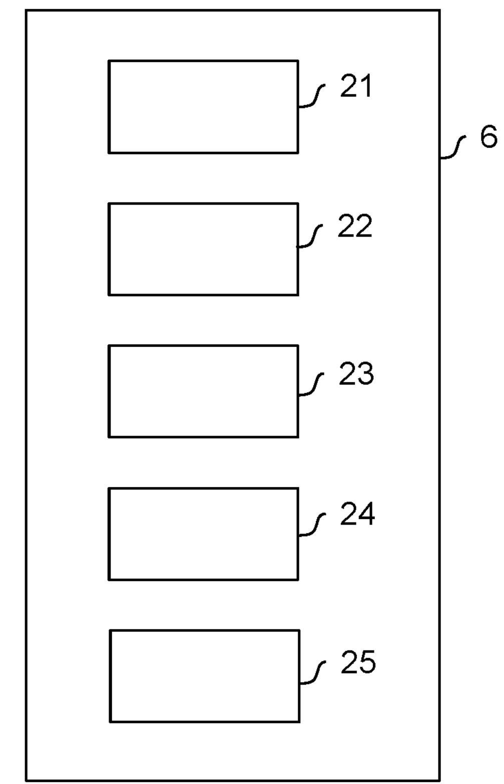
FIG. 10 shows a functional block diagram of a corresponding measuring device according to the exemplary embodiment.
Figure 11:
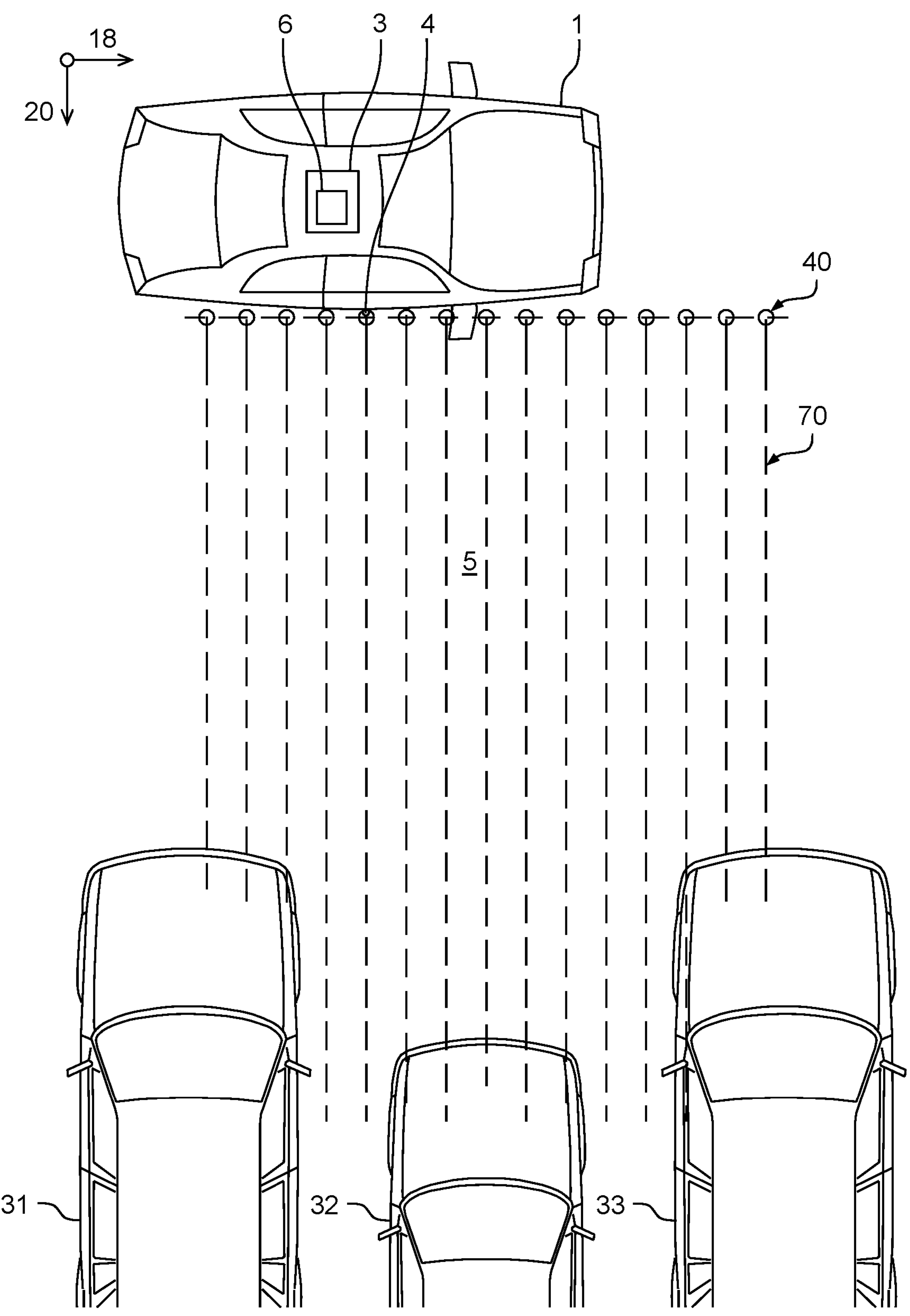
FIG. 11 shows a vehicle driving past lateral surroundings and carrying out a method according to the exemplary embodiment.

FIG. 9 shows a flowchart of a method according to one exemplary embodiment, and FIG. 10 shows a functional block diagram of a measuring device 6 for measuring the lateral surroundings 5 of the vehicle 1 according to the exemplary embodiment. FIG. 11 shows a vehicle 1 driving past lateral surroundings 5 and carrying out a method according to the exemplary embodiment.

The vehicle 1 shown in FIG. 11 is the vehicle shown in FIG. 1 and has a parking assistance system 3, a measuring device 6 and an ultrasonic transceiver 4. The measuring device 6 comprises first to fifth units 21-25 (FIG. 10). Multiple vehicles (high objects, obstacles) 31, 32, 33 are parked in lateral surroundings 5 of the vehicle. In this case, the front of the vehicle 32 parked in the middle is clearly set back in the transverse direction compared to the fronts of the vehicles 31, 33 parked on either side.

In accordance with a proposed parking method according to the exemplary embodiment, the parking assistance system 3 causes the vehicle 1 to drive along the lateral direction 18 at a multiplicity of transmission and reception positions 40, and in the process perform the measurement method illustrated in FIG. 9 according to the exemplary embodiment.

Reference is made to FIG. 9 to FIG. 11.

In step S1 of a proposed measurement method according to the exemplary embodiment, the first unit 21 of the measuring device 6 activates the ultrasonic transceiver 4 at a multiplicity of transmission and reception positions 40 and thereby causes it to transmit a first transmission signal along its transverse axis 70 in a transverse direction 20 and to receive a first reflected received signal waveform (10 in FIG. 5) from the lateral surroundings 5. The ultrasonic transceiver provides the received signal waveforms that are received to the measuring device 6.

Merely for the sake of ease of understanding, it may be assumed here that the vehicle, as part of the proposed parking method, drives to a respective one of the transmission and reception positions 40, stops there, the transmission signal is transmitted and the received signal profile is received, and the vehicle 1 then drives on to a next one of the transmission and reception positions 40 along the lateral direction of travel 18. In this case, the term "transmission and reception position" denotes exactly one respective position. However, the proposed methods are not restricted thereto, and may also be performed with the vehicle 1 driving continuously.

In step S2 of the proposed method, the second unit 22 identifies, for each of the transmission and reception positions 40, a number of echo signals in the respective received signal waveform (10 in FIG. 5). The second unit 21 preferably in this case identifies all echo signals in the respective received signal waveform whose signal intensity is above a predetermined or variable threshold ($V_{th}$ in FIG. 5).

Figure 13:
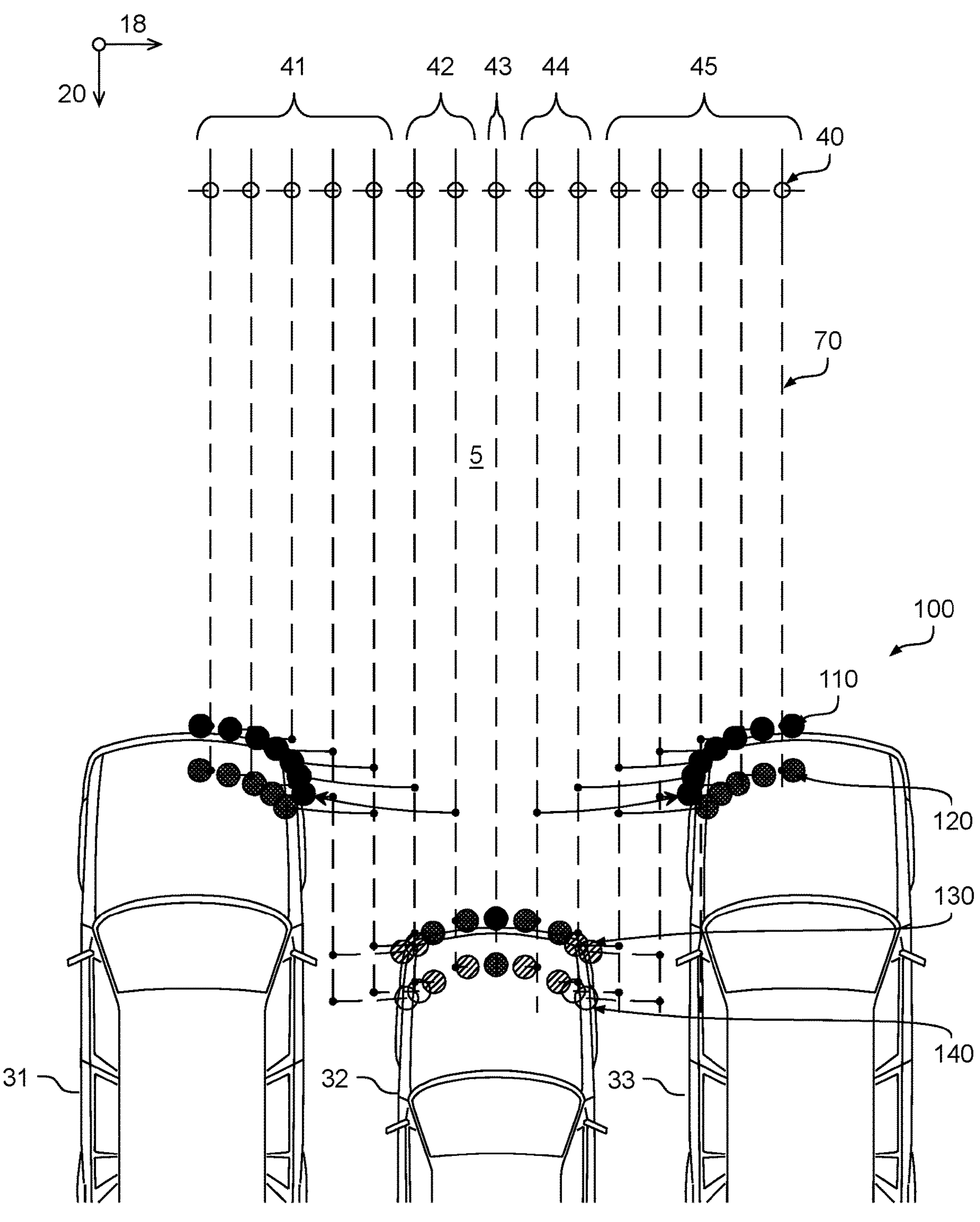
FIG. 13 shows a two-dimensional plot of a set of reflection points from trilaterated reflection points according to the exemplary embodiment.

In step S3, the third unit 23 forms a set of reflection points (100 in FIG. 13) by trilaterating a respective reflection point, that is to say a position of a respective reflection point, in the lateral surroundings multiple times on the basis of two respective received signal waveforms (10 in FIG. 5) from the multiplicity of received signal waveforms at the respective transmission and reception positions 40 and on the basis of a respective echo signal from each of the two received signal waveforms (10 in FIG. 5) and storing it in the set of reflection points (100 in FIG. 13).

Figure 12:
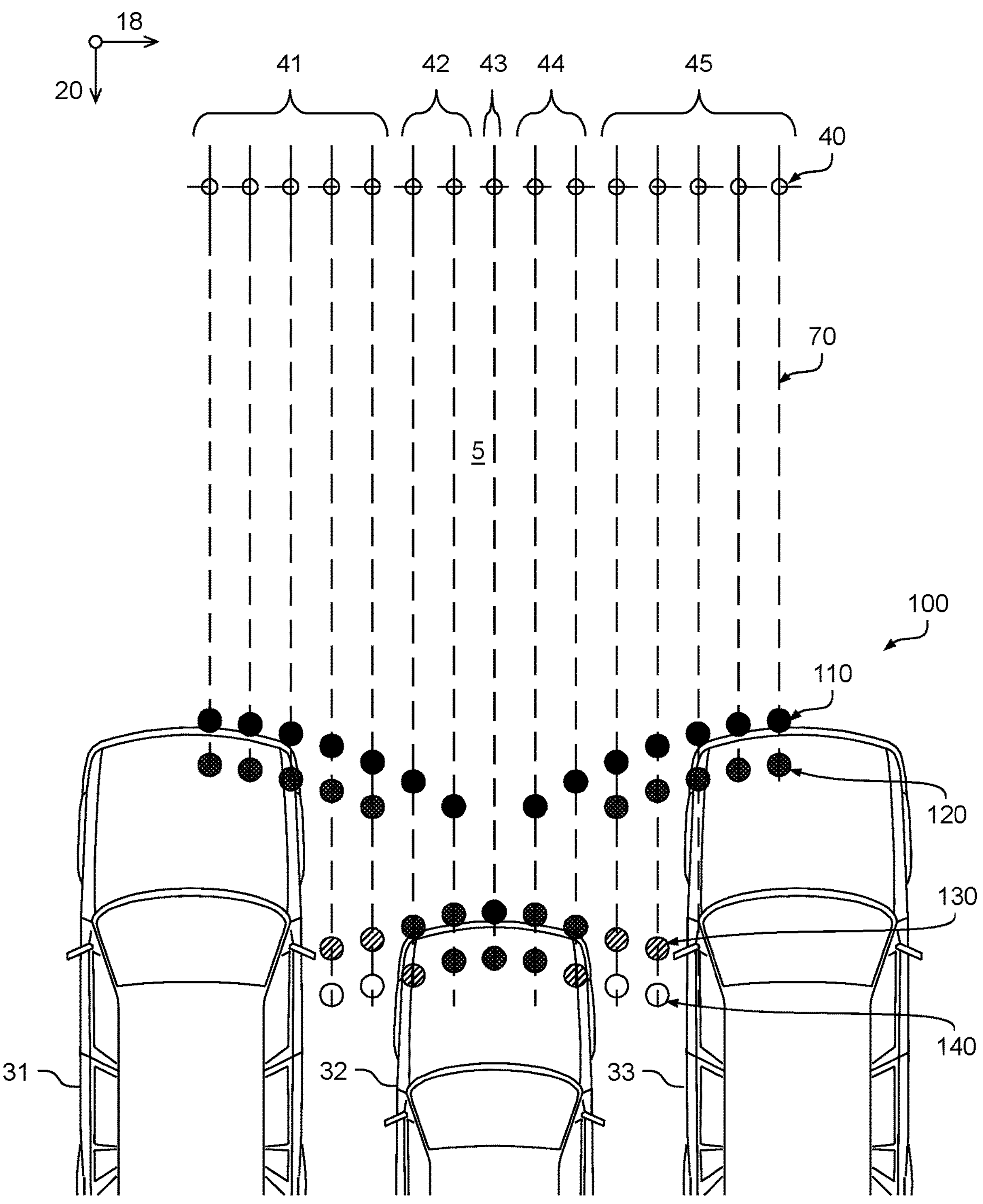
FIG. 12 shows a two-dimensional plot of non-trilaterated reflection points.

FIG. 12 shows a two-dimensional plot of a non-trilaterated set of reflection points 100. In FIG. 12, reflection points 110, 120, 130, 140 are plotted on the assumption that a respective one of the echo signals identified in step S2 was reflected directly and along the respective transverse axis 70 of the ultrasonic transceiver 4 at the respective transmission and reception position 40. In other words, for a respective identified echo signal, a reflection point 110, 120, 130, 140 is plotted along the respective transverse axis of the transverse axes 70 at a distance from the transmission and reception position 40 of the associated echo signal waveform that corresponds to half the time difference between the transmission of the transmission signal and the reception of the received signal waveform multiplied by the speed of sound.

In particular, FIG. 12 shows: first reflection points 110 as filled-in points, the distances of which were determined on the basis of the first echo signals in time of the respective received signal waveforms; second reflection points 120 as double-hatched points, the distances of which were determined on the basis of the second echo signals in time of the respective received signal waveforms, third reflection points 130 as single-hatched points, the distances of which were determined on the basis of third echo signals in time of some of the received signal waveforms, and fourth reflection points 140 as unfilled points, the distances of which were determined on the basis of fourth echo signals in time of some of the received signal waveforms.

The set-back parked vehicle 32 is substantially shaded. In other words, if only the first reflection points 110 were to be considered as primary reflection points and checked for the presence of a secondary reflection point located behind them along the same axis within a predetermined maximum distance of for example 25 to 50 cm and preferably around 35 cm in order to determine whether there is a high or low object height in the direction of the respective transverse axis 70, then a high object height, which corresponds to the parked vehicles 31 and 33, would be recognized at the transmission and reception positions denoted 41 and 45. A low object height able to be driven over when parking would be incorrectly recognized at the transmission and reception positions 40 denoted 42 and 44 in FIG. 12, since the second reflection points 110 at the transmission and reception positions denoted 42 and 44 in FIG. 12 are more than the predetermined maximum distance away from the first reflection points 110. A high object height, indicating the set-back parked vehicle 32, would be correctly recognized only at the transmission and reception position 43. However, if the obtained object heights are evaluated using a statistical method, then this individual (correct) measurement might be filtered out as an outlier and a parking space might be identified incorrectly on the basis of the majority of incorrect measurements in the region 42, 43, 44. In any case, this procedure would result in only seven correct measurement points with correct object height determinations (the position of the reflection points along the transverse axes 70 at the transmission and reception position 43, at the three transmission and reception positions 40 arranged furthest to the left, denoted 41 in FIG. 12, and at the transmission and reception positions 40 arranged furthest to the right, denoted 45 in FIG. 12).

According to the exemplary embodiment, the positions of the reflection points 110, 120, 130, 140 are therefore trilaterated by the third unit 23 in step S3 on the basis of measurements (reflection points 110, 120, 130, 140) from different received signal waveforms.

According to one preferred variant of the exemplary embodiment, reflection points of the same order from adjacent received signal waveforms are in this case trilaterated with one another. The "order" of a reflection point should be understood here to mean the order, that is to say position in a chronological order, of the corresponding echo signal in the corresponding echo signal waveform (10 in FIG. 5). By way of example, a position of one of the first reflection points 110 that was originally assumed on one of the transverse axes 70 at one of the transmission and reception positions 40 is trilaterated on the basis of the position or distance of one of the first reflection points 110 that was originally assumed on a transverse axis 70 adjacent thereto at one of the transmission and reception positions 40 adjacent thereto in accordance with the method described with reference to FIG. 8 and thereby made more precise. However, other variants are conceivable; reflection points of different orders from received signal waveforms that are not directly adjacent may also be trilaterated with one another.

FIG. 13 shows a two-dimensional plot of a set of reflection points 100 formed of trilaterated reflection points 110, 120, 130, 140 according to the exemplary embodiment. This then results in a clearer image. The contours of the parked vehicles 31, 32, 33 are each lined with two rows of reflection points 110, 120, 130, 140. However, it should be pointed out that the first and the third vehicle 31, 33 are each lined with a row of first reflection points 110 and second reflection points 120 located behind them. On the other hand, a contour of the set-back parked vehicle 32 is lined with two rows of higher-order reflection points, with the exception of a central position.

Reference is made to FIG. 9, FIG. 10, FIG. 11 and FIG. 13. In step S4, the fourth unit 24 forms multiple pairs formed of a respective primary reflection point and a respective secondary reflection point of the reflection points 110-140, which it identifies based on an at least position-based criterion as a reflection point of a direct or indirect reflection from one and the same object section of an object 31, 32, 33 in the lateral surroundings 5.

According to the exemplary embodiment, the fourth unit 24 may freely select pairs from the entire set of reflection points 100, and is in particular not restricted to only selecting reflection points from one and the same echo signal waveform (reflection points that are plotted on one and the same axis 70 in FIG. 12).

When forming pairs, each reflection point 110-140 identified as a primary reflection point may in particular be used only once for successful pair formation; however, reflection points 110-140 considered as a secondary reflection point may be used multiple times as secondary reflection points.

It is thereby possible to form a total of at least seven pairs formed of a respective primary reflection point 110 and a respective nearest secondary reflection point 120 along the contour of the vehicle 31 (the right half thereof), even though only five second reflection points 120 have been identified in the region of the contour of the vehicle 31.

It is possible to form at least nine pairs formed of a first-order, second-order or third-order primary reflection point 110, 120, 130 and a second-order, third-order or fourth-order secondary reflection point 120, 230, 140 recognized as being associated based on the position-based criterion in the area of the set-back parked vehicle 32.

It should also be pointed out that the fourth unit 42 does not necessarily require knowledge of the order of the reflection points. It is sufficient for that reflection point of the set of reflection points 100 that has been identified as primary or secondary reflection point to satisfy the position-based criterion.

Reference is made to the description given above with reference to FIG. 6 and the description given below with reference to FIG. 14 for details on the position-based criterion and the principles of identifying pairs of reflection points.

In step S5, the fifth unit 25 of the measuring device 6 determines an object height at a respective one of the reflection points of the set of reflection points 100 in the lateral surroundings 5 as being high if the reflection point 110-140 in question is a primary reflection point of one of the pairs formed, and as being low if no pair comprising the reflection point 110-140 in question as a primary or secondary reflection point was formed in step d).

In the situation shown in FIG. 13, a total of 23 measurement points with positions of reflection points of the set of reflection points 100 would thus be generated, at which a high object height is correctly determined. A significantly higher number of correct measurement points was thus able to be generated than in the case of no trilateration being carried out and double echoes being sought only within one and the same received signal waveform.

After object heights have been determined in this way at a multiplicity of reflection points of the trilaterated set of reflection points 100 (FIG. 13) in the lateral surroundings 5 of the vehicle 1, in the parking method in the exemplary embodiment, it is then possible to determine, in the lateral surroundings 5, a parking space that is free from reflection points with an object height determined as being "high"; and the vehicle, and the parking assistance system may park the 35 vehicle 1 in the parking space. However, in the situation illustrated in FIG. 11 to FIG. 13, no parking space would be correctly determined, and accordingly the vehicle 1 cannot be parked here.

Figure 14:
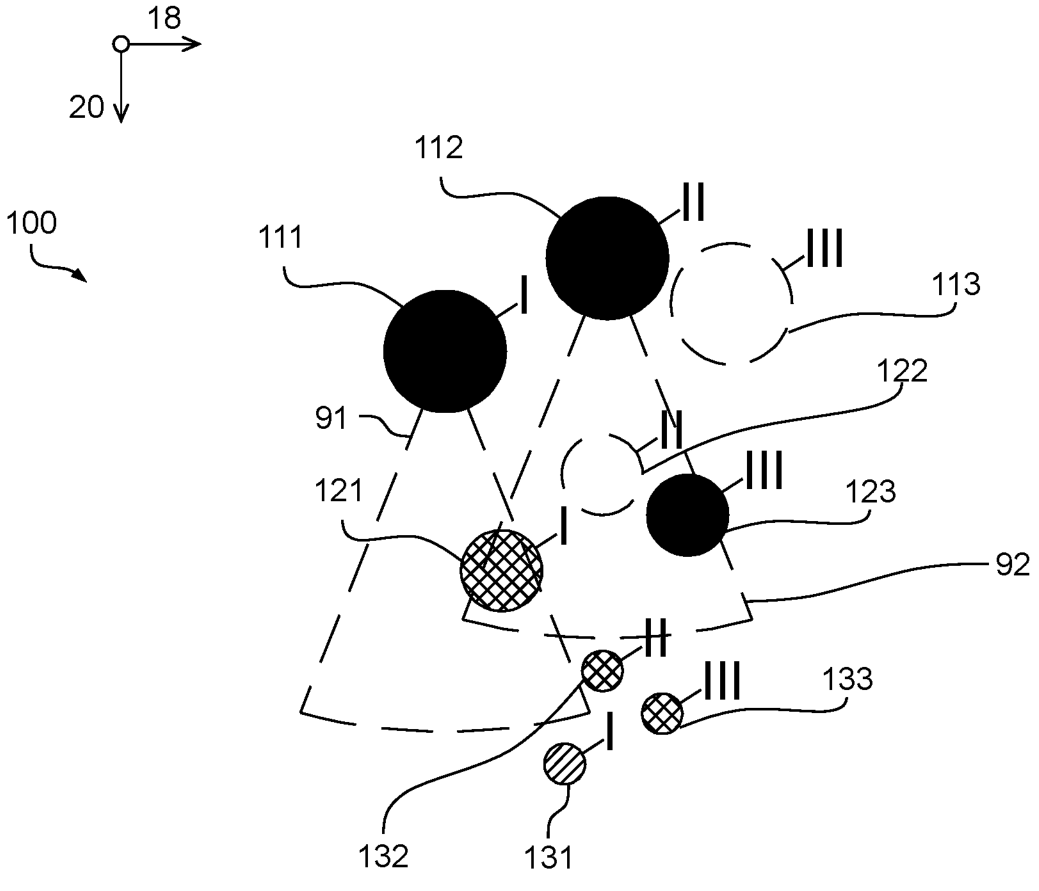
FIG. 14 shows a detail from a set of reflection points to explain criteria for forming pairs of reflections according to exemplary embodiments.

FIG. 14 shows a detail from a set of reflection points comprising multiple reflection points 111-133 to explain criteria for forming pairs of reflection points according to further exemplary embodiments.

In the further exemplary embodiments, in step S3, one or more attributes are stored when forming the set of reflection points in the set of reflection points 100 in addition to the positions of the trilaterated reflection points. The attributes are visualized as follows in FIG. 14:

A first attribute is the order of the two echo signals, that is to say their position in a chronological order of echo signals in a respective received signal waveform (10 in FIG. 5) on the basis of which the reflection point was trilaterated. For easier understanding, it is assumed for the present description that each of the reflection points 111-133 was trilaterated using two echo signals each of the same order. First-order reflection points 111, 112 are illustrated as filled points. Second-order reflection points 121, 123 are illustrated as double-hatched points. Third-order reflection points 131, 132, 133 are illustrated as single-hatched points.

A further attribute is a signal strength, for example the mean value of the maximum amplitudes of the two echo signals on the basis of which the respective reflection point 111-133 was trilaterated. The signal strength is represented in FIG. 14 by the diameter of a respective one of the reflection points 111-133, wherein a large diameter represents a high signal strength and a small diameter represents a low signal strength.

Yet another attribute relates to information about the two received signal waveforms based on which the respective reflection point 111-133 was trilaterated, in particular the transmission and reception position of the respective received signal waveform (10 in FIG. 5). One attribute relating to the identity of the received signal waveforms to be trilaterated is shown in Roman numerals in FIG. 14. In this case, Roman "I" represents a first pair of received signal waveforms, Roman "II" represents a second pair of received signal waveforms and Roman "III" represents a third pair of received signal waveforms. The associated transmission and reception positions may be ascertained on the basis of the identity of a received signal waveform, for example looked up in a table created by the first unit, or the like.

FIG. 14 also shows theoretically expected positions of further reflection points at 122 and 113. Thus, in the second pair II formed of received signal waveforms, a second-order reflection point with an average signal strength would actually be expected at 122. However, the associated echo signals were not identified in the present example due to noise, threshold values selected in an non-optimum manner, or the like. As a result, the reflection point 132, which should be a third-order reflection point in terms of its signal strength, is identified as a second-order reflection point. Likewise, a first-order reflection point with a high signal strength at 113 would actually be expected in the third pair III formed of received signal waveforms. However, the associated echo signals were not identified. For this reason, the reflection point 123, which should be a second-order reflection point in terms of its signal strength, may be incorrectly identified as a first-order reflection point, and the reflection point 133, which should actually be a third-order reflection point in terms of its signal strength, may be incorrectly identified as a second-order reflection point.

Possible position-based and other criteria are discussed below as to how, assuming that the first-order reflection points 111 and 112 are primary reflection points, associated secondary reflection points are able to be ascertained and meaningful measurement points (determinations of object height and associated position) are able to be generated. The criteria discussed below are examples of the "at least position-based criterion" in step S4 (FIG. 9).

FIG. 14 in particular shows that, for each of the primary reflection points 111, 112, a geometric search window 91, 92 is defined, this being aligned with the transverse direction 20, being a mirror image thereof and extending laterally, that is to say in the lateral direction 18, from the primary reflection point 111, 112 in the transverse direction (that is to say away from the transmission and reception positions 40 in FIGS. 11 to 13).

According to one exemplary embodiment, one of the criteria is the fact that the secondary reflection point 121, 123 must be within the geometric search window 91, 92. The fact that the geometric search window is in the shape of a segment of a circle with the primary reflection point 111, 112 as the apex is able to prevent two primary reflection points 111, 112 from being incorrectly recognized as a pair of reflection points formed of a direct and indirect reflection in a purely position-based determination of pairs of reflection points.

Selecting a radius of the geometric search window 91, 92 in the shape of a segment of a circle according to a predetermined maximum distance also makes it possible to ensure that a distance between the primary reflection point 112, 112 and the secondary reflection point 121, 123 is smaller than a predetermined maximum distance.

It should be noted that the second geometric search window 92 that is defined for the primary reflection point 112, which is a first-order reflection point from the second pair II of received signal waveforms, although it does not have a second-order reflection point from the second pair II of received signal waveforms, it does have two second-order reflection points from other received signal waveforms, namely reflection point 121 from the first pair I of received signal waveforms and reflection point 123 from the third pair III of received signal waveforms.

According to one exemplary embodiment, in a case where there is more than one reflection point 121, 123 in a geometric search window 92, the reflection point 123 closest to the primary reflection point 112 is chosen as the secondary reflection point of the pair to be formed.

According to one exemplary embodiment, one of the criteria is the fact that only pairs of reflection points of different orders, and specifically only with a difference of one in order, are combined with one another. Thus, with a difference of one, the order of the echo signals may be combined to form pairs. Accordingly, the reflection point 112 may be combined with the reflection point 121, but not with the reflection point 123. In one variant in which no geometric search windows 91, 92 are used, it is also possible, according to the exemplary embodiment, to prevent a pair being formed from the first, primary reflection point 112 with the third reflection point 133, and thereby possibly shading a pair formed of the third reflection point 133 and a further fourth reflection point (not shown), located behind it, of the same received signal waveform.

According to one exemplary embodiment, one of the criteria is the fact that the secondary reflection point to be selected is further away from the transmission and reception point (40 in FIGS. 11 to 13) of the echo signal associated with the primary reflection point 111, 112 than the first reflection point. In FIG. 14, this criterion is always satisfied for the primary reflection points 111, 112.

According to one exemplary embodiment, one of the criteria is the fact that a signal strength stored as an attribute for the potential secondary reflection point is reduced by no more than a predetermined factor compared to a signal strength stored as an attribute for the potential primary reflection point. In other words, the signal strength of the secondary reflection point must not be greater than the signal strength of the primary reflection point and must not be less than the signal strength of the primary reflection point by more than a predetermined factor. The predetermined factor may be chosen empirically based on typical signal strength relationships. The present criterion could for example be used, in FIG. 14, to prevent the primary first-order reflection point 112 being incorrectly combined with the third-order reflection point 132, even if for example information about the order of the reflection points 111-133 is not available and the geometric search windows 91, 92 are not used.

Based on the position-based and other criteria described above by way of example, it has become clear that, despite the non-recognized reflection point at 122 for the reflection point 112, a pair of reflection points may be formed either with the reflection point 121 or with the reflection point 123, and an additional meaningful measurement point may thus be obtained.

It should in particular also be pointed out that a reflection point that was selected as a secondary reflection point may preferably also be used as a secondary reflection point of further pairs of reflection points, but preferably cannot be used as a primary reflection point of further pairs of reflection points. Thus, in the example in FIG. 14, a first pair of reflection points may be formed from the reflection points 111, 121 and a second pair of reflection points may be formed from the reflection points 112, 121 in one exemplary embodiment. A meaningful measurement point may thus advantageously be obtained both at the position of the primary reflection point 111 and at the position of the primary reflection point 112.

On the other hand, if a pair of reflection points is formed from the reflection points 112 and 123 in one exemplary embodiment, no further pair of reflection points is able to be formed thereafter from the reflection points 123 and 133 in one exemplary embodiment.

This advantageously makes it possible to prevent a non-meaningful measurement point being incorrectly obtained at the position of the reflection point 123 that was recognized as a first-order reflection point, but that actually represents an indirect reflection to the reflection point at 113, which was not identified due to noise or the like.

The criteria described above may be combined with one another in a suitable manner, for example logically and/or probabilistically.

Although the present invention has been described on the basis of exemplary embodiments, it may be modified in many ways.

FIGS. 1 and 11 show the measuring device 6 as part of the parking assistance system 3. However, as an alternative thereto, the measuring device 6 may also be arranged separately in the vehicle 1. The measuring device 6 may also be integrated with the ultrasonic transceiver 4 to form a unit.

The proposed teaching has been described on the basis of the simplifying assumption that the vehicle 1 and the ultrasonic transceiver 4 are located at one and the same transmission and reception position when transmitting a transmission signal and during the entire reception of the received signal waveform, then drives on to a next transmission and reception position, and performs another stationary transmission and reception there. However, it goes without saying that the vehicle 1 may preferably travel at a uniform driving speed along the lateral direction 18. In this case, the transmission position of the transmission signal differs from the respective reception positions of respective echo signals in the received echo signal waveform. A corresponding adaptation of the geometric, trigonometric or mathematical observations disclosed here is of no difficulty for a person skilled in the art.

FIG. 14 shows that the geometric search windows 91, 92 defined for a respective one of the primary reflection points 111, 112 are aligned with the transverse direction 20 and are a mirror image thereof and extend laterally in the lateral direction 18. However, this shape of the geometric search window is only one of many possible examples. If the identity of the one or more respective received signal waveforms is stored in the set of reflections 100 as an attribute, a respective geometric search window 91, 92 may also be aligned on a straight line and be a mirror image thereof, which straight line intersects the transmission and reception position (40 in FIG. 11-13) one of the received signal waveforms and the primary reflection point 111, 112. The geometric search window 91, 92 may also have other shapes that are not in the shape of a segment of a circle, for example a square or a rectangle. The geometric search window 91, 92 defined for a respective primary reflection point 111, 112 does not have to encompass the primary reflection point 111, 112, and may in particular maintain a certain transverse distance to the primary reflection point 111, 112 in order to avoid two excessively close reflection points from two different received signal waveforms being incorrectly identified as a pair of reflection points or double echo.

LIST OF REFERENCE SIGNS

1, 1' vehicle
2 surroundings
3 parking assistance system
4, 4' ultrasonic transceiver
5 lateral surroundings
6 measuring device
7 transverse axis
8 horizontal profile of the transmission signal intensity
9 vertical profile of the transmission signal intensity
10 received signal waveform
11 further parked vehicle
12 first point, first reflection point
13 second point
14 third point
15 ground
16 virtual reflection point, second reflection point
17 curb
18 lateral direction
19, 19' circle
20 transverse direction
21-26 first to sixth unit
31-33 obstacle, object, parked vehicle
40 transmission and reception positions
41-45 transmission and reception positions
70 transverse axes
91, 92 geometric search windows
100 set of reflection points
110 first-order reflection points
111 first-order reflection point
112 first-order reflection point
113 unidentified first-order reflection point
120 second-order reflection points
121 second-order reflection point
122 unidentified second-order reflection point
123 second-order reflection point identified as first-order reflection point
130 third-order reflection points
131 third-order reflection point
132 third-order reflection point identified as second-order reflection point
140 fourth-order reflection points
t0-t6 times
d, d' distances
Vth threshold value
S1-S6 method steps

The invention claimed is:

1. A method for measuring lateral surroundings of a vehicle provided with at least one lateral ultrasonic transceiver, the method comprising:

a) activating the at least one ultrasonic transceiver at a multiplicity of transmission and reception positions along a lateral direction of travel of the vehicle so as to transmit a respective transmission signal in a transverse direction transverse to the direction of travel of the vehicle and receive a respective received signal waveform reflected from the lateral surroundings;

b) identifying a number of echo signals in the respective received signal waveform;

c) forming a set of reflection points by trilaterating a respective reflection point in the lateral surroundings multiple times on the basis of two respective received signal waveforms from the multiplicity of received signal waveforms and on the basis of a respective echo signal from each of the two received signal waveforms and storing it in the set of reflection points;

d) forming multiple pairs formed of a respective primary reflection point and a respective secondary reflection point of the set of reflection points, which are identified on the basis of an at least position-based criterion as reflection points of a direct and/or indirect reflection from one and the same object section in the lateral surroundings, wherein out of multiple reflection points that satisfy the at least position-based criterion in relation to the respective primary reflection point, a reflection point among the multiple reflection points closest to the respective primary reflection point is selected as the respective secondary reflection point of each of the multiple pairs; and e) determining an object height at a respective one of the reflection points in the lateral surroundings as being high if the reflection point in question is a primary reflection point of one of the pairs formed, and as being low if no pair comprising the reflection point in question as a primary or secondary reflection point was formed in step d).

2. The method as claimed in claim 1, wherein the criterion in step e) comprises the fact that a respective secondary reflection point is arranged within a geometric search window defined relative to the respective primary reflection point.

3. The method as claimed in claim 2, wherein the geometric search window comprises at least one reflection point that has been trilaterated based on two respective echo signals that were identified in received signal waveforms other than the two echo signals based on which the primary reflection point was trilaterated.

4. The method as claimed in claim 2, wherein the geometric search window widens laterally in the transverse direction as the distance to the primary reflection point increases.

5. The method as claimed in claim 1, wherein the echo signals identified in the respective received signal waveform are ordered according to their chronological order, and, in step c), echo signals of the same order from echo signal waveforms received at adjacent reception positions are used to trilaterate a respective reflection point.

6. The method as claimed in claim 5, wherein the criterion in step e) comprises the fact that the order of the echo signals based on which the secondary reflection point was trilaterated is one higher than the order of the echo signals based on which the primary reflection point was trilaterated.

7. The method as claimed in claim 1, wherein the criterion in step e) comprises the fact that the secondary reflection point is further away from the transmission and reception point of the echo signal associated with the primary reflection point than the primary reflection point.

8. The method as claimed in claim 1, wherein the criterion in step e) comprises the fact that a distance between the primary reflection point and the secondary reflection point is smaller than a predetermined maximum distance.

9. The method as claimed in claim 1, wherein the criterion in step e) comprises the fact that a signal strength of at least one echo signal based on which the secondary reflection point was trilaterated is reduced by no more than a predetermined factor compared to a signal strength of at least one echo signal based on which the primary reflection point was trilaterated.

10. The method as claimed in claim 1, wherein the trilaterated position of a respective reflection point and optionally one or more attributes are stored in the set of reflection points (100) for the reflection point, and steps e) and f) are performed after the completion of steps a), b) and c) based on the stored positions stored in set of reflection points and where applicable the stored attributes of the reflection points.

11. The method as claimed in claim 1, wherein the echo signals are determined on the basis of a threshold voltage.

12. A method for parking a vehicle that is provided with at least one lateral ultrasonic transceiver and a parking assistance system, comprising:

in order to determine the positions and the object heights at a multiplicity of primary reflection points in the lateral surroundings of the vehicle, performing a method comprising:

a) activating the at least one ultrasonic transceiver at a multiplicity of transmission and reception positions along a lateral direction of travel of the vehicle so as to transmit a respective transmission signal in a transverse direction transverse to the direction of travel of the vehicle and receive a respective received signal waveform reflected from the lateral surroundings;

b) identifying a number of echo signals in the respective received signal waveform;

c) forming a set of reflection points by trilaterating a respective reflection point in the lateral surroundings multiple times on the basis of two respective received signal waveforms from the multiplicity of received signal waveforms and on the basis of a respective echo signal from each of the two received signal waveforms and storing it in the set of reflection points;

d) forming multiple pairs formed of a respective primary reflection point and a respective secondary reflection point of the set of reflection points, which are identified on the basis of an at least position-based criterion as reflection points of a direct and/or indirect reflection from one and the same object section in the lateral surroundings, wherein out of multiple reflection points that satisfy the at least position-based criterion in relation to the respective primary reflection point, a reflection point among the multiple reflection points closest to the respective primary reflection point is selected as the respective secondary reflection point of each of the multiple pairs; and e) determining an object height at a respective one of the reflection points in the lateral surroundings as being high if the reflection point in question is a primary reflection point of one of the pairs formed, and as being low if no pair comprising the reflection point in question as a primary or secondary reflection point was formed in step d);

determining a parking space in the lateral surroundings that is free from reflection points with an object height determined as being "high"; and parking the vehicle in the parking space using the parking assistance system.

13. A non-transitory storage medium comprising instructions that, when executed by a computer device, prompt said computer device to carry out a method, the method comprising:

a) activating the at least one ultrasonic transceiver at a multiplicity of transmission and reception positions along a lateral direction of travel of the vehicle so as to transmit a respective transmission signal in a transverse direction transverse to the direction of travel of the vehicle and receive a respective received signal waveform reflected from the lateral surroundings;

b) identifying a number of echo signals in the respective received signal waveform;

c) forming a set of reflection points by trilaterating a respective reflection point in the lateral surroundings multiple times on the basis of two respective received signal waveforms from the multiplicity of received signal waveforms and on the basis of a respective echo signal from each of the two received signal waveforms and storing it in the set of reflection points;

d) forming multiple pairs formed of a respective primary reflection point and a respective secondary reflection point of the set of reflection points, which are identified on the basis of an at least position-based criterion as reflection points of a direct and/or indirect reflection from one and the same object section in the lateral surroundings, wherein out of multiple reflection points that satisfy the at least position-based criterion in relation to the respective primary reflection point, a reflection point among the multiple reflection points closest to the respective primary reflection point is selected as the respective secondary reflection point of each of the multiple pairs; and e) determining an object height at a respective one of the reflection points in the lateral surroundings as being high if the reflection point in question is a primary reflection point of one of the pairs formed, and as being low if no pair comprising the reflection point in question as a primary or secondary reflection point was formed in step d).

* * * * *